United States Patent
Lu et al.

(10) Patent No.: US 8,161,212 B1
(45) Date of Patent: Apr. 17, 2012

(54) DATA OPERATIONS ACROSS PARALLEL NON-VOLATILE INPUT/OUTPUT DEVICES

(75) Inventors: Ting Lu, Austin, TX (US); Kam-Wing Li, Cupertino, CA (US); Bradley L. Taylor, Santa Cruz, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 12/888,333

(22) Filed: Sep. 22, 2010

(51) Int. Cl.
*G06F 13/12* (2006.01)
*G06F 3/00* (2006.01)
*G06F 1/12* (2006.01)

(52) U.S. Cl. .............. 710/71; 710/20; 710/33; 710/36; 713/400; 713/500; 713/600

(58) Field of Classification Search .................. None
See application file for complete search history.

(56) References Cited

U.S. PATENT DOCUMENTS

| | | | | |
|---|---|---|---|---|
| 5,333,143 | A * | 7/1994 | Blaum et al. ................. | 714/766 |
| 7,284,089 | B2 * | 10/2007 | Gallivan et al. .............. | 711/115 |
| 2005/0223269 | A1 * | 10/2005 | Stolowitz ....................... | 714/6 |
| 2008/0140883 | A1 * | 6/2008 | Salessi et al. .................. | 710/52 |

OTHER PUBLICATIONS

Nass, Rich, "Xilinx puts ARM Core into its FPGAs", EE Times, 2 pp., Apr. 27, 2010, available at http://www.eetimes.com/electronics-products/processors/4115523/Xilinx-puts-ARM-core-into-its-FPGA.

Taylor, Brad and Wittig, Ralph, "28nm Generation Programmable Families", 7 Series FPGAs, Extensible Processing Platform Family, AMBA AX14 IP, Aug. 8, 2010, pp. 1-25, Xilinx, 2100 Logic Drive, San Jose, CA 95124.

* cited by examiner

*Primary Examiner* — Alan Chen
(74) *Attorney, Agent, or Firm* — Kevin T. Cuenot (57) ABSTRACT

An embodiment of a system for implementing parallel usage of a plurality of non-volatile input/output (I/O) devices can include an interface configured to receive, from a source, a source request and a first memory coupled to the interface. The first memory can be configured to store a data unit specified by the source request. The system can include an I/O device controller coupled to the interface. The I/O device controller can be configured to correlate the source request with a plurality of I/O device requests and initiate sending of the plurality of I/O device requests to the plurality of non-volatile I/O devices in parallel. The system also can include a decoder coupled to the first memory and the I/O device controller. The decoder can be configured to receive data from the plurality of non-volatile I/O devices in parallel.

20 Claims, 4 Drawing Sheets

DATA OPERATIONS ACROSS PARALLEL NON-VOLATILE INPUT/OUTPUT DEVICES

FIELD OF THE INVENTION

One or more embodiments disclosed within this specification relate to integrated circuits (ICs). More particularly, one or more embodiments relate to parallel usage of non-volatile I/O devices with an IC.

BACKGROUND

Programmable integrated circuits (ICs) are a well-known type of IC that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect circuitry and programmable logic circuitry are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Programmable ICs are often incorporated into larger systems that can include a non-volatile I/O device (I/O device). Examples of I/O devices can include various flash memory devices including, but not limited to, serial peripheral interface (SPI) flash, queued serial peripheral interface (QSPI) flash, serial advanced technology attachment (SATA) flash, NAND flash, and the like. A data operation, such as a read or a write, within an I/O device is typically performed upon a data block that can store multiple words, bytes, or bits at a particular address within the I/O device. Access times for I/O devices are generally slower than the clock rate of most modern processors and programmable ICs.

Typically, data stored within an I/O device, e.g., configuration data, is loaded into a programmable IC at initialization of a system. The slower access time of the I/O device can create a data bottleneck that impedes the loading of data from the I/O device into the programmable IC. This data bottleneck lengthens the initialization time of the programmable IC. In many applications, the initialization of a system must occur within a limited time frame. As programmable ICs increase in size and complexity, a proportional increase can occur in the quantity of configuration data required to configure the programmable IC. This increase in configuration data can exacerbate the impact of the I/O device induced data bottleneck on the initialization of the programmable IC. As a result, the initialization of the programmable IC, and thus, any system in which the programmable IC is located, may require more time than is desired or permitted.

SUMMARY

One or more embodiments disclosed within this specification relate to integrated circuits (ICs) and, more particularly, to a system for implementing parallel usage of non-volatile I/O devices. An embodiment of a system for implementing parallel usage of a plurality of non-volatile input/output (I/O) devices can include an interface configured to receive, from a source, a source request and also include a first memory coupled to the interface. The first memory can be configured to store a data unit specified by the source request. This embodiment of the system can include an I/O device controller coupled to the interface. The I/O device controller can be configured to correlate the source request with a plurality of I/O device requests and initiate sending of the plurality of I/O device requests to the plurality of non-volatile I/O devices in parallel. This embodiment of the system also can include a decoder coupled to the first memory and the I/O device controller. The decoder can be configured to receive data from the plurality of non-volatile I/O devices in parallel.

An embodiment of a method of performing a write operation in parallel to a plurality of non-volatile I/O devices can include receiving, from a source, a source write request specifying a data unit to be written to the plurality of non-volatile I/O devices and dividing the data unit into a plurality of data segments. The plurality of data segments can be written in parallel to the plurality of non-volatile I/O devices.

An embodiment of a method of performing a read operation in parallel from a plurality of non-volatile I/O devices can include receiving a source read request specifying a data unit stored in the form of a plurality of data segments within the plurality of non-volatile I/O devices and determining each of the plurality of data segments of the data unit as stored within the plurality of non-volatile I/O devices. This embodiment of the method can include sending a plurality of I/O device read requests specifying the plurality of data segments to be read to the plurality of non-volatile I/O devices in parallel and receiving, in parallel from the plurality of non-volatile I/O devices, the plurality of data segments. The data unit specified by the source read request can be assembled from the plurality of data segments.

DETAILED DESCRIPTION OF THE DRAWINGS

While the specification concludes with claims defining the features of one or more embodiments that are regarded as novel, it is believed that the one or more embodiments disclosed within this specification will be better understood from a consideration of the description in conjunction with the drawings. As required, one or more detailed embodiments are disclosed herein; however, it is to be understood that the one or more embodiments disclosed are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used within this specification are not intended to be limiting, but rather to provide an understandable description of one or more embodiments disclosed herein.

One or more embodiments disclosed within this specification relate to integrated circuits (ICs) and, more particularly, to implementing parallel data operations across two or more non-volatile I/O devices (I/O devices). In accordance with one or more embodiments disclosed herein, a controller can execute data operations in parallel using a plurality of I/O devices in response to a data request from a source device. To improve data throughput, a data unit specified by the data request can be divided into smaller data segments by the controller. The data segments can be read from, or written to, multiple I/O devices in parallel during a single, parallel data operation.

Storage locations and ordering of the data segments within the I/O devices can be maintained by the controller. Accordingly, the controller can divide a data unit into a plurality of data segments and store the data segments in the I/O devices in parallel. The controller also can read a plurality of data segments from the I/O devices in parallel and assemble the data units to form a data unit. In this manner, data units can be transferred between the source device and the I/O devices using fewer execution cycles of the I/O devices, thereby increasing the data exchange rate between the source device and the I/O devices.

Figure 1:
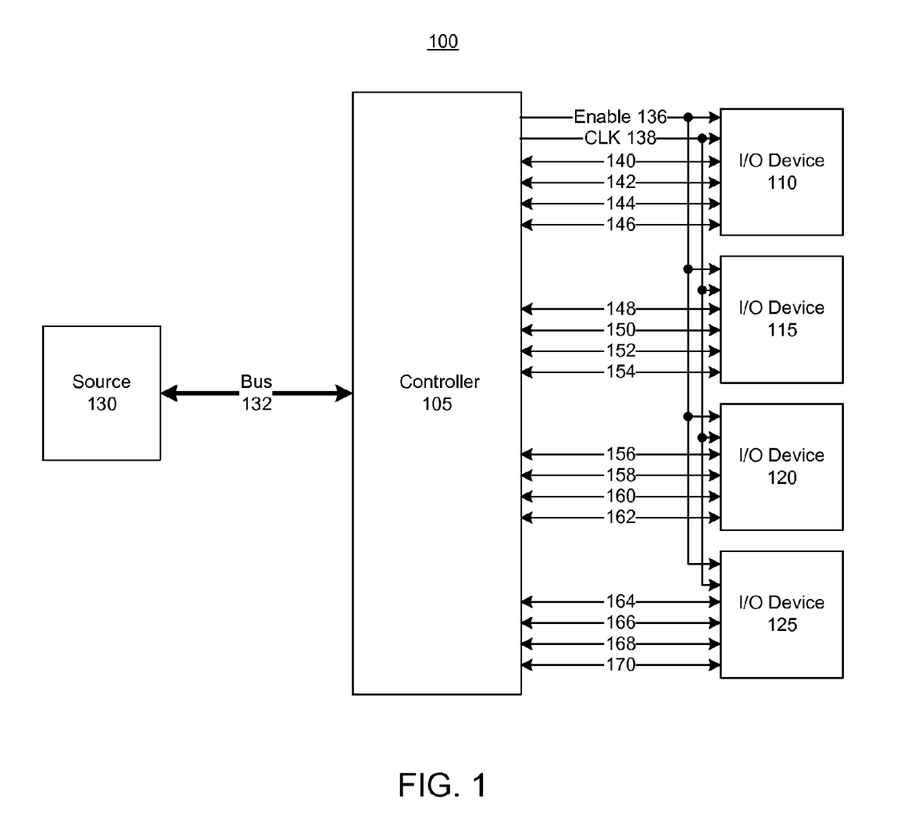
FIG. 1 is a first block diagram illustrating a system for implementing parallel non-volatile input/output (I/O) device (I/O device) operations in accordance with an embodiment disclosed within this specification.

FIG. 1 is a first block diagram illustrating a system for implementing parallel I/O device operations in accordance with an embodiment disclosed within this specification. System 100 facilitates the execution of parallel data operations using two or more I/O devices. Within this specification, a "parallel data operation," for example, a read and/or a write operation, can refer to simultaneous or concurrent issuance of a plurality of I/O device commands to two or more I/O devices. The parallel data operation can simultaneously write or read two or more data segments of a larger data unit. For example, at least one data segment can be written to, or read from, a first I/O device and at least a second data segment can be written to, or read from, a second I/O device concurrently with the first I/O device.

System 100 can include a controller 105, I/O devices 110, 115, 120, and 125, and a source 130. Source 130 can represent one or more source devices coupled to controller 105 via bus 132. Bus 132 can be any of a variety of different communication buses used within processor-based systems. Source 130 can issue a data request directed to controller 105 and I/O devices 110-125. In one or more embodiments, source 130 can be implemented within a same IC as controller 105. For example, source 130 can be a configuration controller within a programmable IC that receives configuration data from I/O devices 110-125 at initialization of the programmable IC. In another example, source 130 can be implemented as a "hard" circuit, e.g., as dedicated processor or controller, or as a "soft" circuit using the programmable fabric of a programmable IC.

In one or more other embodiments, source 130 can be implemented external to the IC that implements controller 105. For example, source 130 can be a processor external to the IC within which controller 105 is implemented. Via bus 132, the processor can use controller 105 as an intermediary to exchange data with I/O devices 110-125. Source 130 can issue data requests to controller 105 in order to access data stored within I/O devices 110-125. For example, the data can be configuration data that is used to configure source 130 or other programmable circuitry.

In another example, the data can be program code that is to be executed by source 130. In this regard, the one or more embodiments disclosed within this specification allow source 130 to execute program code stored within I/O devices 110-125 as if I/O devices 110-125 were implemented as random access memory (RAM) devices.

Each of I/O devices 110-125 can be coupled to controller 105 via a four-bit interface. In one or more embodiments, each of I/O devices 110-125 can be implemented as a flash device. Examples of flash devices can include, but are not limited to, NAND flash, serial peripheral interface (SPI) flash, queued serial peripheral interface (QSPI) flash, serial advanced technology attachment (SATA), or the like. As noted, I/O devices 110-125 can store data to be processed by source 130.

In one or more embodiments, read operations and/or write operations within I/O devices 110-125 can be performed only upon a data block. A data block, for example, can represent a minimum and/or a preset amount of data that can be read from, or written to, one of I/O device 110-125 for a given read or write operation. For purposes of illustration, a block can be approximately one kilobyte of data. Thus, to effectuate a parallel data operation using multiple I/O devices in parallel, the minimum amount of data to be read or written in a parallel data operation is "N" times the data block size, where "N" represents the number of I/O devices in parallel coupled to controller 105. Each data block can be associated with a unique address specifying a location at which the data block resides within one of I/O devices 110-125.

As pictured, each of I/O devices 110-125 can receive enable signal 136. Enable signal 136 can alter I/O devices 110-125 between a disabled state and an enabled state. In the enabled state, each of I/O devices 110-125 can receive and process data requests received through signals 140-170 from controller 105. In the disabled state, each of I/O devices 110-125 can be rendered unresponsive to data requests issued through signals 140-170. Each of I/O devices 110-125 can receive a clock (CLK) signal 138. The frequency of CLK signal 138 can determine the frequency at which data operations are executed within each of I/O devices 110-125. As CLK signal 138 is common to each of I/O devices 110-125, the execution of data operations within I/O devices 110-125 can be synchronized by CLK signal 138.

Each of signals 140-170 can be a bi-directional signal between controller 105 and I/O devices 110-125. Via each of signals 140-170, data can be exchanged between I/O devices 110-125 and controller 105. In the example shown in FIG. 1, each of signals 140-170 can be a bi-directional, single bit signal as each of I/O devices 110-125 is described as having a four bit interface. Accordingly, signals 140-170 can include data that instructs I/O devices 110-125 as to whether a read or a write operation is being requested by controller 105 on an I/O device specific basis.

Accordingly, each of I/O devices 110-125 can be implemented with a four bit interface coupled to controller 105. Although each of I/O devices 110-125 is illustrated as a four bit, bi-directional I/O device, each of I/O devices 110-125 can be implemented as any of a variety of different I/O devices capable of processing one or more bit(s) of data. For example, the size of the interface of each of I/O devices 110-125 can vary depending upon the particular type of I/O device selected for use with system 100. In another example, each of signals 140-170 can be replaced with two distinct signals, whereby one signal is designated for read operations and the other signal is designated for write operations. As such, the configuration of I/O devices 110-125 as shown in FIG. 1 is not intended to be limiting, but rather to provide an understandable description of the one or more embodiments disclosed within this specification.

Accordingly, within this specification, the same reference characters are used to refer to terminals, signal lines, wires, and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

As used within this specification, the phrase "I/O device request" can refer to a request for a data operation as formatted by a protocol used by an I/O device, e.g., I/O devices 110-125, to write data to, and/or read data from, the I/O devices 110-125. The protocol can define the manner in which data specified by the I/O device request is enumerated for the data operation. For example, an I/O device request sent through signals 140-170 can be formatted to include a header that specifies whether the I/O device request is a read request or a write request, e.g., an I/O device command, addressing information for data to be read from or written to the I/O devices, and, in the case of a write operation, the data to be written.

Controller 105 facilitates two way communication between source 130 and I/O devices 110-125. Controller 105 is coupled to bus 132 and monitors bus 132 for transactions directed to controller 105. In one or more embodiments, controller 105 can be implemented within the programmable fabric of a programmable IC. In one or more other embodiments, controller 105 can be implemented as a hard block, e.g., as fixed and dedicated circuitry, within the programmable IC. It should be appreciated, however, that controller 105 can be implemented or instantiated within an IC that is programmable or an IC that is not programmable.

The transactions received by controller 105 can include a source request directed to I/O devices 110-125. As used within this specification, the phrase "source request" can refer to a request for a data operation as formatted by a protocol used by a source, e.g., source 130, to write data to, and/or read data from, a memory device. A source request can specify the type of operation to be performed via a source command, e.g., a read or a write command, addressing information for the data unit to be read from the I/O devices or written to the I/O devices, and, in the case of a write, the data unit to be written.

In one or more embodiments, the protocol used for the source request can be specified in terms of an address using, for example, a protocol used by source 130 to write data to, and/or read data from, a RAM device. The source request, for example, can specify an address of the data unit and a size of the data unit, e.g., thereby specifying an address range. Subsequent to executing the source request, controller 105 can return a response to the source request to source 130 via bus 132.

As used within this specification, the phrase "data unit" can refer to a portion or quantity of data that can be specified or requested by a source such as source 130. In one or more embodiments, a requested data unit can be of a constant predetermined size. For example, a data unit can be the same as or correlated to the size of a data block. In another example, a data unit can be a multiple of the size of a data block. In general, a data block refers to the amount of data that is read from or written to an I/O device for a given I/O device request, whether a read or a write. For some I/O devices, a data block can represent the minimum sized portion of data that can be read from or written to an I/O device. In one or more other embodiments, a data unit can be a plurality of bits, a byte, a word, a long word, or some amount of data less than a data block.

Controller 105 can determine the type of operation specified within a received source request. Controller 105 can direct and perform the data processing required to execute the operation, as specified by the source request, within I/O devices 110-125. Controller 105 can translate source requests to one or more I/O device requests in a format that is understandable and usable by I/O devices 110-125. For example, controller 105 can convert a source request to one or more I/O device requests that can be provided to I/O devices 110-125 that instruct I/O devices 110-125 to read data, write data, or the like. Controller 105 can correlate each source request to one or more I/O device requests necessary to execute a particular operation specified by the source request.

Controller 105 also can convert a data unit specified within a source request to two or more data segments to be stored in parallel within different ones of I/O devices 110-125. Conversely, controller 105 can convert data segments read from I/O devices 110-125 in parallel into an assembled data unit that can be provided to source 130 as a response to a source request. In this manner, controller 105 can increase the data exchange rate between source 130 and I/O devices 110-125 by dividing a data unit specified by a source request into multiple data segments and simultaneously performing data operations involving the data segments in parallel across the plurality of I/O devices 110-125.

In illustration, source 130 can issue a source read request for a data unit. For purposes of illustration, consider the case in which the data unit is formed of four smaller data segments. Controller 105 can process the source read request and generate four individual I/O device read requests, where each I/O device read request specifies an I/O device read command. Each of the I/O device read requests is issued to a different one of I/O devices 110-125. In response, each of I/O devices 110-125 can read out one data segment to controller 105 over signals 140-170. In this manner, responsive to a single source request, controller 105 can retrieve the entire data unit, i.e., all four data segments, from I/O devices 110-125 in parallel. The single source request triggers a plurality of parallel I/O device requests sent to the I/O devices referred to as a parallel data operation. Controller 105 can assemble the received data segments into the data unit specified by the source read request and return the data unit to source 130 via bus 132.

In conventional systems that include I/O devices, the I/O devices are coupled together in a daisy chain structure or serially enabled, one-by-one, in a master-slave configuration. When executing a read operation within a conventional system, an individual I/O device is enabled at least one time by each read request. In a daisy chain configuration, devices are enabled serially, e.g., one after the other. In the case of a four bit I/O device, the I/O device reads out data over four lines in response to the I/O device read request. Within such a system, the processing time required to retrieve the entire data unit from the I/O device is approximately four fold longer than had the transaction been performed using a plurality of I/O devices arranged in parallel as described with reference to FIG. 1. As such, the conventional approach significantly increases the time required to download a requested data unit from the I/O device.

Figure 2:
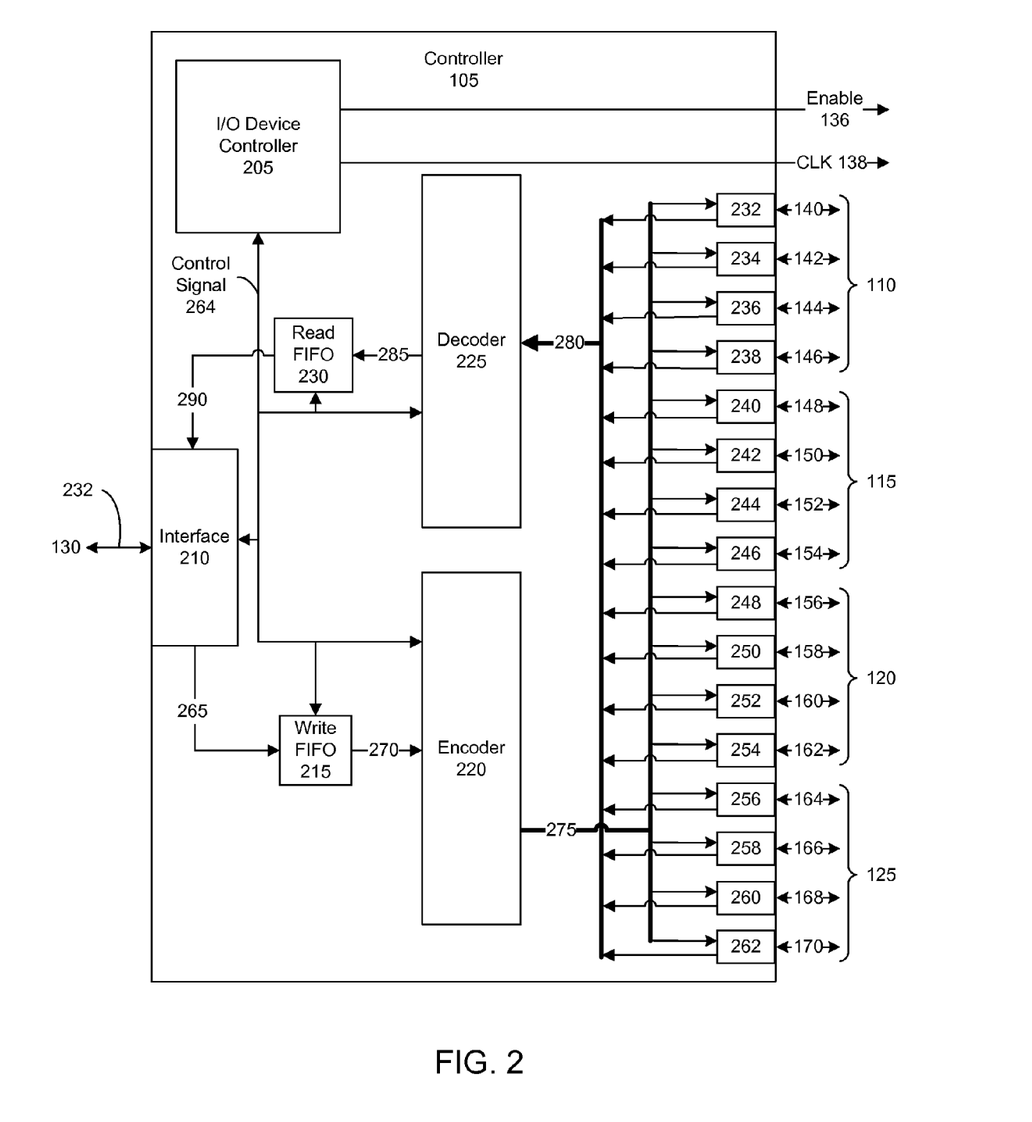
FIG. 2 is a second block diagram illustrating a controller described with reference to FIG. 1 in accordance with an embodiment disclosed within this specification.

FIG. 2 is a second block diagram illustrating controller 105 of FIG. 1 in accordance with an embodiment disclosed within this specification. More particularly, FIG. 2 illustrates a more detailed view of controller 105 described with reference to FIG. 1. As such, like numbers will be used to refer to the same items throughout this specification. Controller 105 can include an I/O device controller (I/O controller) 205, an interface 210, a write first in first out (FIFO) 215, an encoder 220, a decoder 225, a read FIFO 230, and input/output (I/O) blocks 232-262.

As shown, interface 210 can be coupled to source 130 through bus 132. Interface 210 of controller 105 can be configured to communicate over bus 132 using, for example, a same communication protocol as each other device, including source 130, coupled to bus 132. For example, interface 210 can be configured to monitor for bus transactions directed to controller 105, to hold and/or take control of bus 132, and to send transactions from controller 105 to other devices over bus 132. As such, interface 210 can receive source requests directed to controller 105 from source 130 on bus 132 and send responses to source 130 via bus 132.

It should be appreciated that a communication bus is used within this specification for purposes of illustration. In one or more other embodiments, source 130 can be coupled to interface 210 via one or more direct signal links, for example. The particular type of connection between source 130 and controller 105 is not intended as a limitation of the one or more embodiments disclosed within this specification.

In one or more embodiments, different portions of controller 105 can operate within different clock domains, e.g., two different clock domains having different operating frequencies. For example, interface 210 can be clocked according to the same operating frequency as bus 132, which can be different from the clock rate of I/O controller 205. Source 130, being configured to communicate on bus 132, can be clocked at the same operating frequency as the bus and, therefore, interface 210. CLK signal 138 and I/O blocks 232-262, for example, can be clocked at a different operating frequency, e.g., the operating frequency of I/O devices 110-125.

I/O controller 205 can be coupled to interface 210 via control signal 264. Accordingly, interface 210 can alert I/O controller 205 to any source requests received by interface 210 via control signal 264. Similarly, I/O controller 205 can alert interface 210 of the availability of any responses to be provided back from controller 105 to source 130 via control signal 264. Such responses can be sent to source 130 by interface 210 over bus 132 as described.

I/O controller 205 can issue commands, via control signal 264, to components within controller 105 that result in data segments being stored within I/O devices 110-125 or data segments being read out of I/O devices 110-125. I/O controller 205 further can determine an address within each of I/O devices 110-125 to be the object or target of a data operation within each of I/O devices 110-125 and direct any other functionality of I/O devices 110-125 required by controller 105 to process a source request.

Write FIFO 215 can be coupled to interface 210 and receive data units specified within signal 265 from interface 210. Write FIFO 215 can store the data unit in a queue as a series of data elements and output the data elements to encoder 220 via signal 270. As used within this specification, the term "data element," refers to a predetermined number of bits of data of a data unit transmitted within a signal input to, and/or output from, a functional block within controller 105, during a single execution cycle of the functional block. For example, a 100 bit data unit can be transmitted within signal 265 as a series of ten data elements with each data element containing ten bits.

Read FIFO 230 can be coupled to decoder 225 and receive a data unit specified within signal 285 from decoder 225. Read FIFO 230 can store the data unit in a queue as a series of data elements and output the data unit to interface 210 via signal 290. Each of write FIFO 215 and read FIFO 230 can operate under the direction of I/O controller 205 via control signal 264.

In one or more embodiments, each of write FIFO 215 and read FIFO 230 can be implemented as dual port memories. The first port of each of FIFOs 215 and 230 can be coupled to interface 210 and clocked at a first operating frequency, e.g., the same operating frequency as interface 210. The second port of write FIFO 215 can be coupled to encoder 220 and clocked at a second and different operating frequency, e.g., the operating frequency of I/O devices 110-125. Thus, encoder 220 and I/O blocks 232-262 coupled to encoder 220 can be clocked at the second and different operating frequency.

In addition, the size of the data element input to the first port of write FIFO 215 may differ from the size of the data element output from the second port of write FIFO 215. Although the size of the data element input to, and output from, write FIFO 215 may vary, the sequential order in which the data elements are input to, and output from, write FIFO 215 can be retained. For example, the first port of write FIFO 215 can sequentially receive four 8 bit data elements and sequentially output two 16 bit data elements. To retain the sequential order of the data elements, the first 16 bit data element output from write FIFO 215 can be composed of bits 0-7 of the first 8 bit data element input to write FIFO 215 followed by bits 0-7 of the second 8 bit data element input to write FIFO 215. The second 16 bit data element output from write FIFO 215 can be composed of bits 0-7 of the third 8 bit data element input to write FIFO 215 followed by bits 0-7 of the fourth 8 bit data element input to write FIFO 215.

Similarly, the second port of read FIFO 230 can be coupled to decoder 225 and clocked at the second and different operating frequency. In addition, the size of the data element input to the second port of read FIFO 230 may differ from the size of the data element output from the first port of read FIFO 230. Accordingly, control signal 264 to each of write FIFO 215 and read FIFO 230 can include separate and independent read enable signals and write enable signals for each respective port of write FIFO 215 and read FIFO 230.

Encoder 220 can receive a data unit from write FIFO 215 and divide or "encode" the data unit into two or more data segments. Encoder 220 can be coupled to each of I/O blocks 232-262 via signal 275. Encoder 220 can output data segments in parallel to I/O devices 110-125 via I/O blocks 232-262. Similarly, decoder 225 can be coupled to each of I/O blocks 232-262 via signal 280. Decoder 225 can receive two or more data segments in parallel from I/O devices 110-125 via I/O blocks 232-262. Decoder 225 can convert or "decode" the two or more data segments back to a data unit and output the data unit to read FIFO 230. Each of encoder 220 and decoder 225 can operate under the direction of I/O controller 205 via control signal 264.

It should be appreciated that signals 275 and 280 are used for purposes of illustration only and are not intended as limitations of the one or more embodiments disclosed within this specification. For example, each of signals 275 and 280 can represent a plurality of signals, e.g., one signal being coupled from encoder 220 to each of I/O blocks 232-262 and one signal being coupled from decoder 225 to each of I/O blocks 232-262.

In one or more embodiments, each of I/O blocks 232-262 can be implemented as a bi-directional interface between the IC within which controller 105 is implemented and I/O devices 110-125. The functionality of each of I/O blocks 232-262 can be varied between that of an input node and an output node depending upon the data operation being requested for I/O devices 110-125. In one or more other embodiments, each of I/O devices 110-125 can be implemented with each I/O block being dedicated as either an input or an output. In that case, each of I/O blocks 232-262 can be replaced with both a dedicated output block and a dedicated input block.

In operation, interface 210 can monitor bus 132 for a source request from source 130. Subsequent to receiving the source request, interface 210 can alert I/O controller 205 to the presence of the source request. Via control signal 264, interface 210 can pass I/O controller 205 any data within the source request that specifies the type of data operation requested by source 130. In addition, interface 210 can pass to I/O controller 205 any information identifying the data unit specified within the source request.

I/O controller 205 can correlate the source addressing for the data unit to one or more locations within one or more or all of I/O devices 110-125 mapped to store data segments of the data unit. The correlation of locations within I/O devices 110-125 can be implemented using any of a variety of techniques. In one or more embodiments, a mapping can be predetermined and stored within I/O controller 205 that correlates source addressing for data units to particular locations within I/O devices 110-125. I/O controller 205 can associate a range of source defined addresses within a source request to a location within each of I/O devices 110-125.

For example, consider the case in which each of I/O devices 110-125 is configured to perform data operations in 100 byte data blocks. In that case, the first 400 source defined addresses can be mapped by I/O controller 205 to a first address location associated with each of I/O devices 110-125. In illustration, a source write request can include a 400 byte data unit having a source address for the data unit. I/O controller 205 can subdivide the data unit into four 100 byte data segments. I/O controller 105 can determine a first address for I/O device 110 within which the first data segment is stored, a second address for I/O device 115 within which the second data segment is stored, a third address for I/O device 120 within which a third data segment is stored, and a fourth address for I/O device 125 within which a fourth data segment is stored.

Alternatively, in one or more embodiments, data units within successive source write requests to controller 105 can be stored sequentially within I/O devices 110-125 and a mapping of the storage location, e.g., the address, of each data segment for each successive data unit within I/O devices 110-125 can be retained within I/O controller 205. Responsive to a source read request, the data unit specified by the source read request can be correlated to the mapped storage locations for the individual data segments of the data unit specified by the source write request. The data segments that form the requested data unit can be retrieved from the mapped, e.g., determined, locations within I/O devices 110-125.

Continuing with the source write request example, I/O controller 205 can alert write FIFO 215 to the presence of the data unit. For example, I/O controller 205 can write enable the first port of FIFO 215. Interface 210 can pass the data unit as series of data elements to write FIFO 215 via signal 265. I/O controller 205 can direct write encoder 220 to read the data from FIFO 215 via signal 270. Within encoder 220, the data unit can be divided into two or more data segments to be written to I/O devices 110-125 over signals 140-170. The size of data segments and the manner in which the data unit is distributed among the data segments can depend upon the particular implementation of the encoder 220 and/or I/O devices 110-125.

In one or more embodiments, the data unit can be divided into a number of data segments equal to the number of I/O devices used, e.g., four in this example. Further, each data segment can be subdivided according to the number of signals or bits of the interface of the I/O devices, e.g., in this case four. Thus, each data segment is further subdivided for transmission over four, one-bit signal lines.

In illustration, with I/O devices 110-125 collectively being coupled to controller 105 via 16 one bit lines, i.e., signals 140-170, each data unit can be divided into four data segments. As noted, the first data segment is sent to I/O device 110 via signal lines 140-146. The second data segment is sent to I/O device 115 via signal lines 148-154. The third data segment is sent to I/O device 120 via signal lines 156-162. The fourth data segment is sent to I/O device 125 via signal lines 164-170.

When the data unit is 32 bits, for example, each of signals 140-170 can carry two bits of data referred to as a "sub-segment" for purpose of discussion. In that case, signal line 140 can carry a sub-segment formed of bits 0 and 16, signal line 142 can carry a sub-segment formed of bits 1 and 17, signal line 144 can carry a sub-segment formed of bits 2 and 18, signal line 146 can carry a sub-segment formed of bits 3 and 19, etc. Thus, the first data segment can be formed of bits 0, 1, 2, 3, 16, 17, 18, and 19, e.g., the sub-segment on each of signal lines 140-146. Continuing with this example, the second data segment can be formed of bits 4, 5, 6, 7, 20, 21, 22, and 23, e.g., the sub-segments on each of signal lines 148-154, and so forth.

The examples presented within this specification are provided for purposes of illustration only. The size of the segments can vary. The size of the sub-segments also can vary. In one or more embodiments, for example, the size of the data segments exchanged over signals 140-170 can be predetermined and equivalent in size. For example, each data segment can be set equal to the size of a data block in reference to the basic unit of data that is handled by I/O devices 110-125. Accordingly, each signal line will carry an amount of data approximately equal to the size of a data segment divided by the number of bits of the interface to an I/O device. Continuing with this example, the minimum amount of data that can be written to, or read from, I/O devices 110-125 will be four data blocks, e.g., one data block multiplied by the number of I/O devices used in parallel.

Each of I/O devices 110-125 can be enabled by I/O controller 205 via enable signal 136. In addition, I/O controller 205 can enable each of I/O blocks 232-262 as output nodes. I/O controller 205 can direct encoder 220 to write the data segments to locations within I/O devices 110-125 correlated to the data unit or a first available storage location within each of I/O devices 110-125. For example, I/O controller 205 can direct encoder 220 to write the data segments to the first locations available within each of I/O devices 110-125 for storing data. Presuming that data is written in parallel, the first location available within each of I/O devices 110-125 can be substantially similar if not the same. In another example, I/O controller 205 can direct encoder 220 to write the data segments to locations within I/O devices 110-125 previously mapped to the source defined address range of the data unit.

For example, I/O controller 205 can direct encoder 220 to output an I/O device write request to each of I/O devices 110-125 over signals 140-170. As noted, each I/O device write request can specify a command, address information specifying a target location to write data, and the data, e.g., segment(s), to be written. Thus, signals 140-146 can specify a first I/O device write request including a first I/O device write command to I/O device 110. Signals 148-154 can specify a second I/O device write request specifying a second I/O device write command to I/O device 115. Signals 156-162 can specify a third I/O device write request specifying a third I/O device write command to I/O device 120. Signals 164-170 can specify a fourth I/O device write request specifying a fourth I/O device write command to I/O device 125. Each I/O device write command can specify a location to which the data segment to follow is to be written.

It should be appreciated that depending upon the size of the data unit and the manner of sizing of data sub-segments, it may not be necessary for encoder 220 to output a data sub-segment on each of signals 140-170 or the same number of data segments over each of signals 140-170. For example, a data unit can be divided into five data sub-segments by encoder 220. In that case, I/O controller 205 can write the five data sub-segments in parallel using only five of signals 140-170. Alternatively, I/O controller 205 can write a data to each of signals 140-170 with a data sub-segment of the data unit written to each of only five of signals 140-170, e.g. signal 140-148, and spurious data formatted as data sub-segments sent via the remaining ones of signals 140-170, e.g., signals 150-170.

Further, in certain cases the amount of data to be sent can exceed the size limitations of four data segments in this example. In that case two or more parallel write operations to each of I/O devices 110-125 may be required. In illustration, encoder 220 can divide a data unit into eight data segments, where each data segment corresponds to a data block. A first I/O device write command can be sent to each of I/O devices 110-125 writing data segments 1-4 respectively. A second I/O device write command can be sent to each of I/O devices 110-125 writing data segments 5-8 respectively.

Subsequent to storing data segments within I/O devices 110-125, I/O controller 205 can retain a location in which the data segments are stored within each of I/O devices 110-125. Using the location information, the I/O controller 205 can initiate parallel reads of I/O devices 110-125 and allow decoder 225 to construct a data unit from the retrieved data segments. Thus, data sub-segments can be interleaved to form data segments and data segments can be interleaved to form the desired data unit.

When interface 210 receives a source read request specifying a data unit to be read out of the I/O devices 110-125, each of I/O devices 110-125 can be enabled by I/O controller 205 via enable signal 136. In addition, I/O controller 205 can enable each of I/O blocks 232-262 initially as output nodes to send the I/O device read command to each of I/O devices 110-125. Subsequently, each of I/O blocks 232-262 can be enabled as input nodes to receive the requested data segments from each of I/O devices 110-125.

I/O controller 205 can correlate the data unit specified by the source read request to corresponding locations within I/O devices 110-125. I/O controller 205 can direct decoder 225 to output one or more I/O device read requests to each of I/O devices 110-125 via signals 140-170 to read out data at a particular address location within each of I/O devices 110-125. Each I/O device read command within an I/O device read request can specify the location within the respective one of I/O devices 110-125 from which the data segment of the requested data unit stored within that I/O device is to be read.

In illustration, consider the case in which each of I/O devices 110-125 is implemented as a four bit QSPI flash device. Further, assume four data segments are stored within I/O devices 110-125 for a requested data unit. Each of I/O devices 110-125 can be enabled by enable signal 136. As noted, each of I/O devices 110-125 can be clocked according to CLK signal 138 for synchronization with I/O controller 205. Decoder 225 can output an I/O device read request to each of I/O devices 110-125 via signals 140-170 requesting a data segment of the data unit to be read from each respective I/O device 110-125.

Thus, signals 140-146 can specify a first I/O device read command to I/O device 110. Signals 148-154 can specify a second I/O device read command to I/O device 115. Signals 156-162 can specify a third I/O device read command to I/O device 120. Signals 164-170 can specify a fourth I/O device read command to I/O device 125. Each I/O device read command can specify a location from which a data segment is to be read. It should be appreciated that depending upon the size of the data unit and the manner of sizing the data segments, it may not be necessary for decoder 225 to receive one or more data segments from each of I/O devices 110-125. Responsive receiving the I/O device read commands, each of I/O devices 110-125 can output the requested data segments in parallel.

In one or more embodiments, encoder 220 can be configured as an output path of controller 105 and decoder 225 can be configured as an input path of controller 105. Accordingly, I/O device write requests can be output via encoder 220 as described. In the case of an I/O device read request, however, the I/O device read requests can be output via encoder 220, e.g., through the output path. Data segments received from I/O devices 110-125 in response to the I/O device read requests can be received via decoder 225. The appropriate switching of I/O blocks 232-262 as inputs and outputs can be implemented.

Accordingly, when each of I/O blocks 232-262 is configured to output data, e.g., in this case the I/O device read requests, I/O blocks 232-262 can be operatively coupled to encoder 220 to receive the I/O device read requests. The I/O device read requests, for example, can be specified, or provided, by I/O device controller 205 via control signal 264. Each of I/O blocks 232-262 then can be operatively coupled to decoder 225. I/O blocks 232-262 can receive the data segments from I/O devices 110-125 and send the data segments received from I/O devices 110-125 to decoder 225.

I/O controller 205 can direct decoder 225 to construct the requested data unit from the data segments received from I/O devices 110-125 by effectively reversing the encoding applied when data is subdivided into data segments and data sub-segments. As was the case with write operations, depending upon the size of the data unit, decoder 225 may not need to issue a read request for a data segment within each of signals 140-170. Further, depending upon the size of the data unit, two or more parallel read requests to each of I/O devices 110-125 may be required to recover each of the data segments mapped to the data unit specified by a source read request.

Having received the data segments from I/O devices 110-125, decoder 225 can decode the data segments by interleaving the data as described. The interleaved data can be output from decoder 225 to read FIFO 230 thereby constructing the requested data unit. Subsequent to the data segments being decoded, read FIFO 230 can alert I/O controller 205 that the data unit is available. I/O controller 205 can direct interface 210 to read the data unit from read FIFO 230 via signal 290. Interface 210 can alert source 130 via bus 132 that a response to the source read request is available and pass the requested data unit to source 130 within the response.

Figure 3:
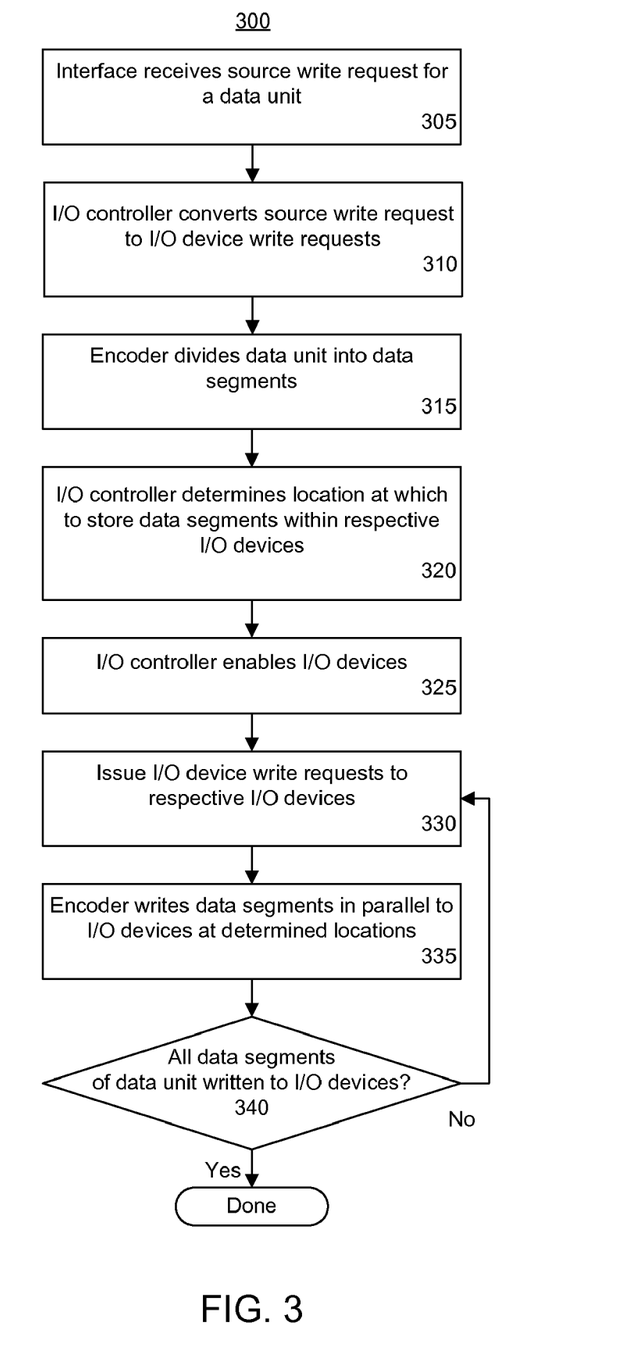
FIG. 3 is a first flow chart illustrating a method of performing a parallel write operation to a plurality of I/O devices in accordance with an embodiment disclosed within this specification.

FIG. 3 is a first flow chart illustrating a method 300 of performing a parallel write operation to a plurality of I/O devices in accordance with an embodiment disclosed within this specification. Method 300 can be implemented using a system as described with reference to FIGS. 1 and 2. In general, FIG. 3 describes a method of converting a source write request to a parallel write operation including parallel I/O device write requests directed to two or more I/O devices as performed by the controller illustrated with reference to FIG. 2.

Beginning with step 305, within the controller, an interface can receive a source write request from a source. The source write request can specify a data unit to be stored within the I/O devices. In general, each source write request can specify a source command, e.g., a write command, addressing information for the data unit, and the data unit itself. In step 310, an I/O controller, within the controller, can convert the source write request to one or more I/O device write requests necessary to write the data unit in parallel as data segments to the I/O devices. Each I/O device write request can specify an I/O device write command, a data segment to be written, and an I/O device specific address to which the data segment is to be written. Thus, the conversion or translation includes conversion of the source write request to a plurality of I/O device write requests, each specifying an I/O device write command specifying an I/O device address to which a data segment is to be written, and a data segment. The I/O device command(s) can coordinate and direct operations within the I/O devices. Control signals generated by the I/O controller can coordinate and direct other functional blocks within the controller to perform the parallel write operations.

In step 315, the encoder within the controller can divide the data unit into a plurality of encoded data segments. In general, the size of each data segment is dependent upon the format used to store data within the I/O devices. In step 320, the I/O controller can determine a location at which each data segment of the data unit is stored within the I/O devices. In general, the I/O controller can store each data unit received from the source within the I/O devices according to a mapping of the address for the data unit to addresses for the I/O devices. The I/O controller can store the location within the I/O devices in which each data segment of the data unit is stored.

It should be appreciated that in determining a location at which each data segment is to be stored, a particular one of the plurality of I/O devices can be selected. In one or more embodiments, a same address can be used for each of the I/O devices. In one or more other embodiments, a different address can be used for each of the I/O devices. In any case, the mapping of data unit addressing to I/O devices and I/O device addressing can be maintained within the I/O controller.

Further, while the I/O controller does not actually perform the division of the data unit into data segments, the I/O controller does have knowledge of how to process the data unit into segments. For example, the I/O controller will know the number of data segments that will result from the subdivision operation performed by the encoder in order to generate the needed addressing information for the encoder and/or decoder and to generate the formed I/O device requests provided to the encoder and/or decoder as the case may be.

In step 325, the I/O controller can enable the I/O devices. The I/O controller can enable some or all of the I/O devices dependent upon a number of data segments to be stored within the I/O devices and available storage locations within the I/O devices. Beginning in step 330, the I/O controller can begin initiating the sending of I/O device write requests to the I/O devices in parallel. The I/O device request can be provided from the I/O controller to the encoder or the decoder as the case may be for transmission to the I/O devices. Accordingly, in step 330, the encoder can send at least one I/O device write command to each of the I/O devices under the control of the I/O controller. The I/O device write commands can specify the operation to be performed, e.g., a write, and the location at which to store the data to follow within the I/O devices. In step 335, the encoder can write the data segments in parallel to the I/O devices for storage at the determined I/O device addresses under the control of the I/O controller.

In decision box 340, the I/O controller can determine whether all data segments of the data unit have been written to the I/O devices. In certain instances the size of the data unit to be written to the I/O devices can exceed the number of data segments that can be stored within the I/O devices by a single parallel write operation. When data segments remain to be written subsequent to the initial parallel write operation, method 300 can return to step 335 and the I/O controller can begin sending the next series of I/O device write requests to the I/O devices. When no additional data segments of the data unit remain to be written to the I/O devices, method 300 can end until such time that another source write request is received.

Figure 4:
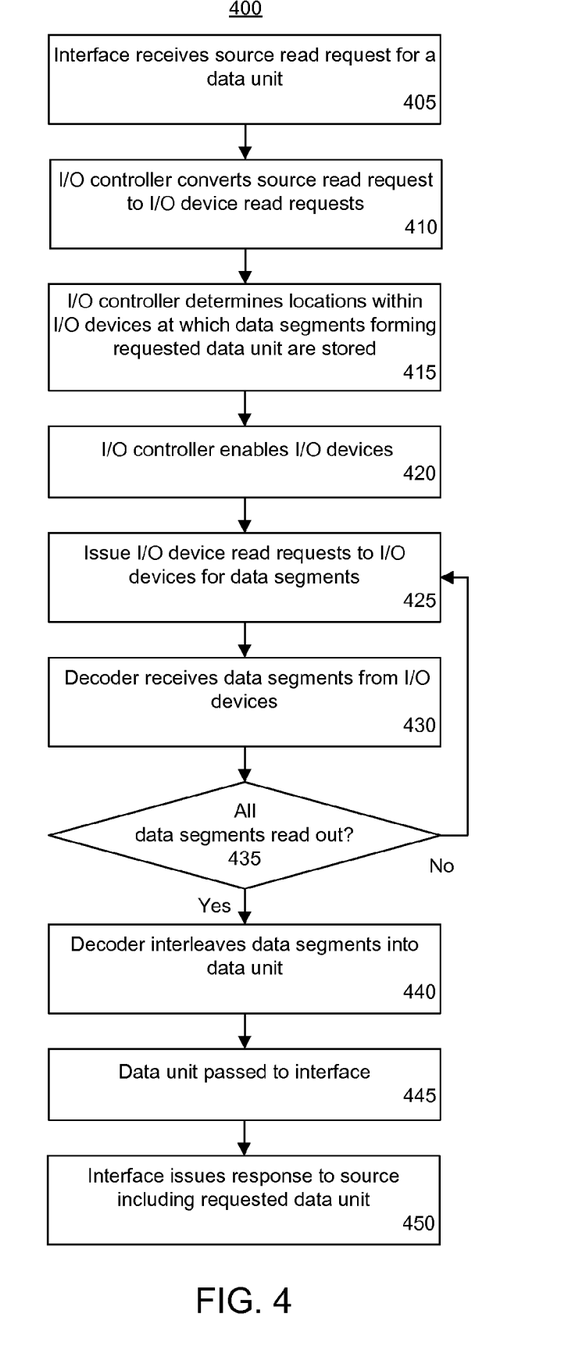
FIG. 4 is a second flow chart illustrating a method of performing a parallel read operation from a plurality of I/O devices in accordance with an embodiment disclosed within this specification.

FIG. 4 is a second flow chart illustrating a method 400 of performing a parallel read operation from two or more I/O devices in accordance with an embodiment disclosed within this specification. Method 400 can be implemented using a system as described with reference to FIGS. 1 and 2. In general, FIG. 4 describes a method of converting a source read request into a parallel read operation involving two or more I/O devices as performed by the controller illustrated with reference to FIG. 2.

Beginning in step 405, within the controller, an interface can receive a source read request for a data unit stored within the I/O devices. In step 410, an I/O controller within the controller can correlate the source read request to one or more I/O device read requests necessary to read out data segments associated with the requested data unit in parallel from the I/O devices. Correlating the source read request to I/O device read requests can include generating I/O device read commands to be specified by each I/O device read request. The I/O controller can, via control signals, direct operations with the I/O devices and other functional blocks within the controller to effectuate the parallel transfer of data from the I/O devices.

In step 415, the I/O controller can determine locations, e.g., I/O device addresses, within the I/O devices at which data segments forming the requested data unit are stored. In determining locations at which data segments are stored within the I/O devices, the I/O controller further determines which I/O device stores each respective data segment so that the determined location is correlated to a particular one of the I/O devices. As noted, in one or more embodiments, a same address can be used for each of the I/O devices if originally stored using such a convention. In one or more other embodiments, a different address can be used for each of the I/O devices if the data segments were originally stored using such a convention. In any case, the mapping of data unit addressing to I/O devices and I/O device addressing can be maintained within the I/O controller.

In step 420, the I/O controller can enable the I/O devices. In step 425, the I/O controller can cause I/O device read requests to be issued to the I/O devices. For example, the I/O controller can cause an I/O device read request to be issued to each of the I/O devices. Each I/O device read request can specify an I/O device read command and the I/O device address determined in step 415 from which a data segment is to be read for the particular I/O device to which the I/O device read command is directed. As noted, the I/O device read requests can be forward to the I/O devices via the encoder or the decoder under the control of the I/O controller. In one or more other embodiments, the I/O device read request also can specify the quantity of data to be read. In step 430, the decoder, within the controller, can receive data segments from the I/O devices.

In decision box 435, the I/O controller can determine whether all data segments needed to assemble the requested data unit have been read out of the I/O devices. In certain instances, the size of the requested data unit can be large enough that additional I/O device read commands must be sent to the I/O devices since the data unit size exceeds the amount of data that can be read out during a single parallel read operation. When data segments remain to be read out from the I/O devices subsequent to the initial parallel read operation, method 400 can return to step 425, and the I/O controller can issue further I/O device read requests to retrieve the next series of data segments from the I/O devices. The I/O controller can continue issuing I/O device read requests to the I/O devices until all data segments of the data unit are received from the I/O devices.

When no additional data segments of the data unit remain to be read out of the I/O devices, method 400 can proceed to step 440. In step 440, the decoder can interleave data within the data segments received from the I/O devices. It should be appreciated that data can be interleaved and stored within the FIFO memory described herein while data is being read out of the I/O devices rather than at the conclusion of the operation. In any case, the manner in which the data segments are interleaved, i.e., decoded, is dependent upon the technique previously used to divide and store the data unit as data segments or, stated differently, the manner in which the data segments were previously encoded.

In step 445, the decoder can return the requested data unit to the interface. In step 450, the interface can alert the source that a response to the source read request is available and forward the response, including the requested data unit, to the source.

The flowcharts in the figures illustrate the architecture, functionality, and operation of possible implementations of systems, methods and computer program products according to one or more embodiments disclosed within this specification. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be embedded in a device such as a computer program product, which comprises all the features enabling the implementation of the methods described herein. The device can include a data storage medium, e.g., a computer-usable or computer-readable medium, storing program code that, when loaded and executed in a system comprising memory and a processor, causes the system to instantiate a system, e.g., circuitry, within a programmable IC that performs at least a portion of the functions described within this specification. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A system for implementing parallel usage of a plurality of non-volatile input/output (I/O) devices, the system comprising:
    an interface configured to receive, from a source, a source request;
    a first memory coupled to the interface, wherein the first memory is configured to store a data unit specified by the source request;
    an I/O device controller coupled to the interface, wherein the I/O device controller is configured to correlate the source request with a plurality of I/O device requests and initiate sending of the plurality of I/O device requests to the plurality of non-volatile I/O devices in parallel; and
    a decoder coupled to the first memory and the I/O device controller, wherein the decoder is configured to receive data from the plurality of non-volatile I/O devices in parallel;
    wherein the I/O device controller is configured to provide a single clock signal that is distributed to each of the plurality of non-volatile I/O devices in parallel.

2. The system of claim 1, wherein when the source request is a source read request, the plurality of I/O device requests are I/O device read requests each specifying a data segment that, when combined with each other data segment specified by the plurality of I/O device requests, forms the data unit.

3. The system of claim 2, wherein the decoder is further configured to send the plurality of I/O device read requests to the non-volatile I/O devices in parallel under control of the I/O device controller.

4. The system of claim 2, further comprising:
    an encoder coupled to the interface and the I/O device controller, wherein the encoder is configured to send the plurality of I/O device read requests to the non-volatile I/O devices in parallel under control of the I/O device controller.

5. The system of claim 1, further comprising:
    an encoder configured to write the data unit to the plurality of non-volatile I/O devices by writing a first plurality of bits of the data unit to a first of the plurality of non-volatile I/O devices and a second plurality of bits of the data unit sequentially following the first plurality of bits to a second non-volatile I/O device of the plurality of non-volatile I/O devices in parallel and concurrently with the first plurality of bits.

6. The system of claim 5, wherein a number of bits of the first plurality of bits corresponds to a width of a communication channel to the first non-volatile I/O device; and
    wherein a number of bits of the second plurality of bits corresponds to a width of a communication channel to the second non-volatile I/O device.

7. The system of claim 1, wherein the source request is a source write request and the plurality of I/O device requests are I/O device write requests, the system further comprising:
    a second memory coupled to the interface, wherein the second memory is configured to store the data unit specified by the source write request; and
    an encoder coupled to the second memory and the I/O device controller,
    wherein the I/O device controller is further configured to correlate the source write request with the plurality of I/O device write requests,
    wherein the encoder is configured to send the plurality of I/O device write requests to the plurality of non-volatile I/O devices in parallel responsive to the source write request under control of the I/O device controller,
    wherein each I/O device write request specifies a data segment from a plurality of data segments forming the data unit and an address at which the data segment is to be stored within one of the plurality of non-volatile I/O devices.

8. The system of claim 7, wherein the I/O device controller is further configured to determine the address at which each of the plurality of data segments is to be stored within the plurality of non-volatile I/O devices as specified by the plurality of I/O device write requests.

9. The system of claim 1, wherein the I/O device controller is further configured to provide a single enable signal that is distributed to each of the plurality of non-volatile I/O devices in parallel.

10. A method of performing a write operation in parallel to a plurality of non-volatile input/output (I/O) devices, the method comprising:
    receiving, from a source, a source write request specifying a data unit to be written to the plurality of non-volatile I/O devices;
    dividing the data unit into a plurality of data segments;
    wherein a first data segment comprises a first plurality of bits of the data unit and a second data segment comprises a second plurality of bits of the data unit sequentially following the first plurality of bits; and
    writing the first data segment to a first of the plurality of non-volatile I/O devices and writing the second data segment to a second of the plurality of non-volatile I/O devices in parallel and concurrently with the first data segment.

11. The method of claim 10, further comprising:
    for each of the plurality of data segments, selecting a non-volatile I/O device from the plurality of non-volatile I/O devices and an address within the selected non-volatile I/O device in which to store the data segment.

12. The method of claim 10,
    wherein a number of bits of the first data segment corresponds to a width of a communication channel to the first non-volatile I/O device; and
    wherein a number of bits of the second data segment corresponds to a width of a communication channel to the second non-volatile I/O device.

13. The method of claim 11, further comprising:
    concurrently enabling each of the plurality of non-volatile I/O devices;
    generating a first I/O device write request comprising a first data segment of the plurality of data segments;
    generating a second I/O device write request comprising a second data segment of the plurality of data segments; and
    sending the first I/O device write request to a first of the plurality of non-volatile I/O devices concurrently with sending a second I/O device write request to a second of the plurality of non-volatile I/O devices in parallel.

14. The method of claim 13, further comprising:
including a first address within the first I/O device write request, wherein the first address indicates where the first data segment is stored within the first non-volatile I/O device; and
including a second address within the second I/O device write request, wherein the second address indicates where the second data segment is stored within the second non-volatile I/O device.

15. A method of performing a read operation in parallel from a plurality of non-volatile input/output (I/O) devices, the method comprising:
receiving a source read request specifying a data unit stored in the form of a plurality of data segments within the plurality of non-volatile I/O devices;
determining each of the plurality of data segments of the data unit as stored within the plurality of non-volatile I/O devices;
sending a plurality of I/O device read requests specifying the plurality of data segments to be read to the plurality of non-volatile I/O devices in parallel;
providing a single clock signal that is distributed to each of the plurality of non-volatile I/O devices in parallel;
receiving, in parallel from the plurality of non-volatile I/O devices, the plurality of data segments; and
assembling the data unit specified by the source read request from the plurality of data segments.

16. The method of claim 15, further comprising:
for each of the plurality of data segments, determining a non-volatile I/O device of the plurality of non-volatile I/O devices within which the data segment is stored and an address of each non-volatile I/O device at which the data segment is stored.

17. The method of claim 15, further comprising:
converting the source read request to a plurality of I/O device read requests to read out the plurality of data segments from the plurality of non-volatile I/O devices.

18. The method of claim 17, further comprising:
concurrently enabling each of the plurality of non-volatile I/O devices;
sending a first of the plurality of I/O device read request to a first of the plurality of non-volatile I/O devices concurrently with sending a second of the plurality of I/O device read requests to a second of the plurality of non-volatile I/O devices in parallel; and
receiving the plurality of data segments from the first and the second of the plurality of non-volatile I/O devices in parallel.

19. The method of claim 15, wherein reconstructing the data unit further comprises interleaving the plurality of data segments forming the data unit specified by the source read request.

20. The method of claim 15, further comprising:
sending the data unit specified by the source read request to the source.

* * * * *